Patented Jan. 2, 1934

1,942,274

UNITED STATES PATENT OFFICE 1,942,274

PRIMING MIXTURE

Willi Brün, Bridgeport, Conn., assignor to Remington Arms Company, Inc., a corporation of Delaware No Drawing. Application October 19, 1931
Serial No. 569,835

16 Claims. (Cl. 52—4)

This invention relates to priming mixtures for ammunition and contemplates the use as priming mixture ingredients of certain recently discovered salts of organic nitro acids.

Ammunition priming mixtures as ordinarily made comprise three classes of ingredients: a fuel, or substance to be oxidized; an oxidizer, to furnish the oxygen necessary for the oxidizing of the fuel; and, a combustion initiator, having the function of starting the reaction between the fuel and the oxidizer. Frequently neither the fuel nor the oxidizer is itself subject to decomposition under the stimulus of a blow. The combustion initiator, however, must be sensitive to shock, its decomposition being productive of sufficient heat and pressure to cause reaction between the oxidizer and fuel.

Mercury fulminate has been very extensively used in priming mixtures as a combustion initiator. However, mercury fulminate is undesirable by reason of its high cost, its poisonous character, and the ease with which it reacts with other priming mixture ingredients to deteriorate the mixture upon storage, as well as the ease with which it reacts with certain metals which are very desirable for priming mixture containers. For these reasons, according to recent practice, mercury fulminate has been replaced wholly or in part by explosive materials, chiefly organic salts, among which may be mentioned the normal lead salt of styphnic acid, usually called lead trinitroresorcinate. In many priming mixtures normal lead styphnate alone does not possess the necessary sensitiveness to shock, hence it has been used chiefly in conjunction either with mercury fulminate or with more sensitive organic nitrates, such as guanylnitrosaminoguanyltetracene.

The present invention contemplates the use in a priming mixture of a recently discovered crystalline form of a basic lead salt of styphnic acid. Said crystalline basic lead styphnate is not to be confused with the previously known amorphous form of the same substance since the two are quite distinct in their physical properties and chemical reactions. In order to clearly distinguish between the two, the preparation of what will be called the yellow or amorphous form of basic lead styphnate will first be described:

Said yellow basic lead styphnate is precipitated when a solution of 12.2 grams of styphnic acid and 8 grams of sodium hydroxide in 750 c. c. of water at a temperature of 95° to 100° C. is dropped into a solution of 50 grams of lead nitrate in 1250 c. c. of water, the lead nitrate solution being stirred during the addition of the styphnic acid and sodium hydroxide solution. It should be noted that the lead nitrate solution is quite dilute and contains a large excess of the quantity of lead nitrate necessary to complete the reaction which results in the precipitation of basic lead styphnate. The precipitate is of light yellow color and fluffy character. It tends to remain in suspension in the solution, and upon settling out tends to form long needle-shaped yellow crystals. Its specific gravity is 3.878, and its is highly electrostatic.

The red or crystalline form of basic lead styphnate, which is the subject of the present invention, is prepared as follows: A solution of 12.2 grams of styphnic acid and 8 grams of sodium hydroxide in 400 c. c. of water at a temperature between 60° and 70° C. is dropped with stirring into a solution of 35 grams of lead nitrate in 350 c. c. of water. When certain necessary precautions are observed, the resulting precipitate is of a wholly different character from that which is secured under the first process above described. At first the sodium styphnate-sodium hydroxide solution must be added very slowly, drop-by-drop, to the lead nitrate solution. The precipitate appears to be first formed as amorphous yellow basic lead styphnate. If a suitable time is permitted to elapse before more sodium styphnate-sodium hydroxide solution is added, the amorphous yellow precipitate suspended in the solution crystallizes in small regular diamond-shaped crystals of a reddish brown color which quickly settle out of the solution. As the operation proceeds the sodium styphnate-sodium hydroxide solution may be added more rapidly. The precipitate has a specific gravity of 4.059, is much less electrostatic than yellow basic lead styphnate, of a totally different crystalline character, and quite a different color. Its analysis indicates a lead content of 60.02%, which approximates the theoretical lead content, 59.94%, of basic lead styphnate of the formula

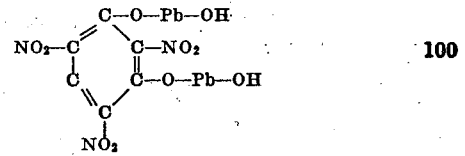

This substance has shown extraordinary properties as a priming mixture ingredient. It is deficient in oxygen and, for this reason, it serves as a fuel; at the same time it is sufficiently sensitive to friction and percussion to be capable of use without the usual combustion initiator such as mercury fulminate or guanylnitrosaminoguanyltetracene. It may be used either with or without another explosive, such as normal lead styphnate, and it has been found practicable to precipitate normal lead styphnate and the red crystalline basic lead styphnate together. Mixtures thus secured will, for the purpose of the present specification and claims, be called "precipitated mixtures" to distinguish them from mechanical mixtures. Such precipitated mixtures containing up to 90% of either salt and 10% of the other have been found useful in priming mixtures. A mixture containing the salts in equal amounts is especially desirable and is secured as follows: A solution of 4.9 grams of styphnic acid and 2.4 grams of sodium hydroxide in 150 c. c. of water is dropped into a solution of 10 grams of lead nitrate in 150 c. c. of water; the temperature being maintained between 60° and 70° C. The red crystalline basic lead styphnate comes out first, probably on account of its smaller solubility in water. As the reaction proceeds, an increasing proportion of normal lead styphnate is precipitated with a corresponding decrease in the amount of the basic salt. After cooling, the precipitate is recovered by filtration and washing with water. Under a microscope, the substance thus secured is clearly seen to consist of a mixture of separate crystals of the two salts, the two kinds of crystals being readily distinguishable. Such a mixture of the two different salts of styphnic acid has been used successfully in such mixtures as those hereinafter mentioned.

While red crystalline basic lead styphnate or a mixture thereof with normal lead styphnate may in mixtures for certain purposes serve as the fuel, as well as the explosive, in other mixtures it may be desirable to add another fuel, such as lead sulphocyanate.

A typical mixture in which basic lead styphnate has replaced normal lead styphnate is the following:

| | Per cent |
|---|---|
| Red crystalline basic lead styphnate | 40 |
| Guanylnitrosaminoguanyltetracene | 2 |
| Lead sulphocyanate | 8 |
| Lead nitrate | 30 |
| Glass | 20 |

A typical mixture in which the combustion initiating ingredient, such as guanylnitrosaminoguanyltetracene, is entirely omitted, is as follows:

| | Per cent |
|---|---|
| Red crystalline basic lead styphnate | 12 |
| Normal lead styphnate | 30 |
| Lead sulphocyanate | 8 |
| Lead nitrate | 30 |
| Glass | 20 |

A mixture in which basic lead styphnate is used in conjunction with normal lead styphnate without either the usual combustion initiator or the usual fuel is the following:

| | Per cent |
|---|---|
| Red crystalline basic lead styphnate | 20 |
| Normal lead styphnate | 30 |
| Lead nitrate | 30 |
| Glass | 20 |

A successful mixture in which basic lead styphnate serves the three-fold purpose of explosive, fuel and combustion initiator, and the only other active ingredient is an oxidizer, is as follows:

| | Per cent |
|---|---|
| Red crystalline basic lead styphnate | 50 |
| Lead nitrate | 30 |
| Glass | 20 |

All of the foregoing mixtures have been found entirely satisfactory in actual practice. The formulas, however, are to be understood as merely illustrative formulas, basic lead styphnate being useful in a wide variety of mixtures other than the specific examples above given. For example, if the characteristics of a particular cartridge make it desirable to use a fuel of somewhat abrasive character, lead sulphocyanate may be replaced wholly or in part by antimony sulphide and/or calcium silicide in such mixtures as the following:

| | Per cent | Per cent |
|---|---|---|
| Normal lead styphnate | 10 to 40 | preferred 25 |
| Red crystalline basic lead styphnate | 10 to 40 | preferred 9 |
| Antimony sulphide | 5 to 30 | preferred 14 |
| Calcium silicide | 2 to 20 | preferred 7 |
| Lead nitrate | 30 to 60 | preferred 42 |
| Guanylnitrosaminoguanyltetracene | 1 to 6 | preferred 3 |

Similarly, lead nitrate is merely a typical oxidizer for which other nitrates, such as basic lead nitrate and barium nitrate, and/or various chromates, permanganates, oxides and peroxides, may be substituted. Likewise the separate ingredients normal lead styphnate and red crystalline basic lead styphnate may be replaced by a precipitated mixture of these salts as heretofore described.

Since the present invention constitutes the first discovery of the desirable properties of the red crystalline form of basic lead styphnate as a priming mixture ingredient, the appended claims are to be broadly construed.

What is claimed is:

1. An ammunition priming mixture containing red crystalline basic lead styphnate.

2. An ammunition priming mixture containing red crystalline basic lead styphnate, and normal lead styphnate.

3. An ammunition priming mixture consisting wholly of red crystalline basic lead styphnate, an oxidizer, and an abrasive.

4. An ammunition priming mixture the active ingredients of which consist wholly of red crystalline basic lead styphnate and an oxidizer.

5. An ammunition priming mixture containing red crystalline basic lead styphnate, an oxidizer, and a fuel.

6. An ammunition priming mixture containing red crystalline basic lead styphnate and guanylnitrosaminoguanyltetracene.

7. An ammunition priming mixture the active ingredients of which consist wholly of red crystalline basic lead styphnate, and lead nitrate.

8. An ammunition priming mixture containing normal lead styphnate, red crystalline basic lead styphnate, and an oxidizer.

9. An ammunition priming mixture containing normal lead styphnate, red crystalline basic lead styphnate, and lead nitrate.

10. An ammunition priming mixture comprising as its only active ingredients, normal lead styphnate, red crystalline basic lead styphnate, and an oxidizer.

11. An ammunition priming mixture containing normal lead styphnate, red crystalline basic lead styphnate, an oxidizer, and a fuel.

12. An ammunition priming mixture comprising substantially

| | Per cent |
|---|---|
| Red crystalline basic lead styphnate | 12 to 50 |
| Guanylnitrosaminoguanyltetracene | 0 to 2 |
| Normal lead styphnate | 0 to 40 |
| Lead sulphocyanate | 0 to 8 |
| Lead nitrate | approximately 30 |
| Abrasive | approximately 20 |

13. The method of making a mixture of normal lead styphnate and red crystalline basic lead styphnate in approximately equal proportions which comprises precipitating said mixture by adding to a solution having a concentration of the order of 10 grams of lead nitrate in 150 c. c. of water and at a temperature of about 60° to 70° F., a solution having a concentration of the order of 4.9 grams of styphnic acid and 2.4 grams of sodium hydroxide in 150 c. c. of water.

14. A priming composition containing a precipitated mixture of normal lead styphnate and red crystalline basic lead styphnate.

15. A priming composition containing a precipitated mixture of normal lead styphnate and red crystalline basic lead styphnate in the proportions of 90% of either salt to 10% of the other.

16. A priming composition containing a precipitated mixture of normal lead styphnate and red crystalline basic lead styphnate in substantially equal proportions.

WILLI BRÜN.